US008416765B2

(12) United States Patent
Kishida

(10) Patent No.: US 8,416,765 B2
(45) Date of Patent: Apr. 9, 2013

(54) RELAY DEVICE, TELEPHONE SYSTEM, RELAY PROGRAM PRODUCT, AND COMPUTER-READABLE RECORDING MEDIUM RECORDING RELAY PROGRAM

(75) Inventor: Hiroyuki Kishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/160,878

(22) PCT Filed: Jan. 15, 2007

(86) PCT No.: PCT/JP2007/050379
§ 371 (c)(1),
(2), (4) Date: Jul. 14, 2008

(87) PCT Pub. No.: WO2007/083581
PCT Pub. Date: Jul. 26, 2007

(65) Prior Publication Data
US 2010/0172489 A1  Jul. 8, 2010

(30) Foreign Application Priority Data
Jan. 23, 2006 (JP) .................. 2006-013718

(51) Int. Cl.
*H04L 12/66* (2006.01)
(52) U.S. Cl.
USPC ........................................ 370/352; 370/353
(58) Field of Classification Search .................... 370/352
See application file for complete search history.

(56) References Cited

U.S. PATENT DOCUMENTS

| | | | | |
|---|---|---|---|---|
| 6,909,708 B1* | 6/2005 | Krishnaswamy et al. | ..... | 370/352 |
| 7,190,773 B1* | 3/2007 | D'Silva et al. | ........... | 379/142.06 |
| 7,710,873 B2* | 5/2010 | Pulkka et al. | ................. | 370/235 |
| 7,894,383 B2* | 2/2011 | Ikeda et al. | .................... | 370/328 |
| 2002/0061012 A1* | 5/2002 | Thi et al. | ........................ | 370/352 |
| 2006/0075108 A1* | 4/2006 | Sylvain | ......................... | 709/227 |
| 2008/0101554 A1* | 5/2008 | Rhee et al. | .................... | 379/67.1 |
| 2009/0059939 A1* | 3/2009 | Anderson, IV | ............... | 370/401 |
| 2009/0310600 A1* | 12/2009 | Kung et al. | ................... | 370/352 |
| 2010/0061228 A1* | 3/2010 | Grabelsky et al. | ............ | 370/221 |

FOREIGN PATENT DOCUMENTS

| | | |
|---|---|---|
| JP | 5-75716 A | 3/1993 |
| JP | 2001-157236 A | 6/2001 |
| JP | 2001-203756 | 7/2001 |
| JP | 2003-289345 A | 10/2003 |
| JP | 2005-311577 A | 11/2005 |

\* cited by examiner

*Primary Examiner* — Creighton Smith
(74) *Attorney, Agent, or Firm* — Birch, Stewart, Kolasch & Birch, LLP

(57) ABSTRACT

A home gateway includes a WAN interface portion, a LAN interface portion and an analog interface portion, and a LAN controller, an analog controller and a central controller. The WAN interface portion communicates with an external telephone set. The LAN interface portion communicates with a plurality of telephone sets configuring an IP telephone system. The LAN controller and the analog controller control the LAN interface portion and the analog interface portion such that type information is transmitted to a destination telephone set. The central controller generates the type information in accordance with a type of information to be communicated to the external telephone set, based on the information received by the WAN interface portion. Thus, a user can readily determine which telephone set is to be used to receive a call when a plurality of telephone sets can receive a call from a calling party.

9 Claims, 16 Drawing Sheets

FIG.4

| DATA LINK LAYER HEADER | IP HEADER | UDP HEADER | SIP DATA |
|---|---|---|---|
| 64 | 65 | 66 | 67 |

FIG.5

| INVITE | REQUEST FOR JOINING (STARTING) SESSION |
|---|---|
| ACK | ACKNOWLEDGE FINAL RESPONSE TO INVITE |
| BYE | END SESSION |
| CANCEL | END SESSION DURING PROBABILITY |
| REGISTER | REGISTER DEVICE POSITION INFORMATION (REGISTER THE FACT THAT DEVICE HAS BEEN STARTED UP) |

FIG.6

| 1XX | REQUEST WAS RECEIVED AND PROCESSING OF REQUEST IS BEING CONTINUED (PROVISIONAL RESPONSE) |
|---|---|
| 2XX | REQUEST SUCCEEDED (SUCCESSFUL RESPONSE) |
| 3XX | PROVIDE INFORMATION ON NEW LOCATION OF USER OR INFORMATION ON ALTERNATIVE SERVICE (REDIRECTED RESPONSE) |
| 4XX | REQUEST IS ERRONEOUS, OR DESIGNATED SERVER CANNOT RESPOND TO THAT REQUEST (CLIENT · ERROR RESPONSE) |
| 5XX | SERVER FAILED TO EXECUTE REQUEST (SERVER · ERROR RESPONSE) |
| 6XX | NO SERVER COULD EXECUTE REQUEST (GLOBAL ERROR RESPONSE) |

FIG.7

| v= | SDP VERSION INFORMATION |
|---|---|
| o= | STARTER OF SESSION AND IDENTIFICATION INFORMATION OF SESSION |
| s= | SESSION NAME |
| c= | CONNECTION INFORMATION |
| t= | START·END TIME OF SESSION |
| m= | CLASS OF MEDIA AND TRANSPORT ADDRESS |
| a= | ATTRIBUTE OF MEDIA |

FIG.8

| MEDIA IDENTIFICATION | PRESENCE/ABSENCE OF VIDEO IMAGE DATA CAN BE DETERMINED BASED ON INFORMATION SUCH AS audio, video, application, data, AND control |
|---|---|
| PORT NUMBER | NUMBER OF PORT OF MEDIA RECEPTION |
| TRANSPORT PROTOCOL | RTP/AVP OR UDP; THE FORMER IS DESIGNATED WHEN RTP PACKET COMPLYING WITH RFC 1890 IS USED, AND THE LATTER IS DESIGNATED WHEN PACKET IS IN UNIQUE FORMAT |
| MEDIA FORMAT LIST | DESIGNATE PAYLOAD TYPE DEFINED UNDER RFC 1890. PAYLOAD TYPE INCLUDES ENCODING METHOD NAME, CLOCK RATE, AND THE NUMBER OF CHANNELS. |

FIG.9

| PAYLOAD TYPE | PAYLOAD TYPE OF MEDIA FORMAT DESIGNATED WITH m |
|---|---|
| ENCODING METHOD NAME | DESIGNATE ENCODING METHOD NAME |
| CLOCK RATE | DESIGNATE CLOCK |

FIG.10

| FORMAT | PAYLOAD TYPE OF MEDIA FORMAT DESIGNATED WITH m |
|---|---|
| PARAMETER SPECIFIC TO FORMAT | PARAMETER USED IN MEDIA DESIGNATED WITH FORMAT |

FIG.14

| VIDEOPHONE-EXCLUSIVE CALL RECEPTION SETTING |
|---|
| ⊗ACTIVE (INCOMING CALL ARRIVES ONLY AT TELEPHONE SET HAVING VIDEOPHONE FUNCTION)<br>○INACTIVE (INCOMING CALL ARRIVES AT ALL TELEPHONE SETS) |

FIG.15

| NO | FUNCTION | |
|---|---|---|
| | VIDEOPHONE | VOICE TELEPHONE |
| 1 | OK | OK |
| 2 | OK | OK |
| 3 | NG | OK |
| 4 | NG | OK |
| ⋮ | ⋮ | ⋮ |

| NOTIFICATION SETTING |
|---|
| ⊘NOTIFICATION OF INCOMING CALL CLASS INFORMATION (VIDEOPHONE OR VOICE TELEPHONE)<br>○NOTIFICATION OF CALLER NUMBER |

| NO | FUNCTION | | TELEPHONE SET |
|---|---|---|---|
| | VIDEOPHONE | VOICE TELEPHONE | |
| 1 | OK | OK | IP TELEPHONE |
| 2 | OK | OK | IP TELEPHONE |
| 3 | NG | OK | IP TELEPHONE |
| 4 | NG | OK | PLAIN OLD TELEPHONE |
| ⋮ | ⋮ | ⋮ | ⋮ | ced
RELAY DEVICE, TELEPHONE SYSTEM, RELAY PROGRAM PRODUCT, AND COMPUTER-READABLE RECORDING MEDIUM RECORDING RELAY PROGRAM

TECHNICAL FIELD

The present invention relates to a relay device, a telephone system, a relay program product, and a computer-readable recording medium recording a relay program, and more particularly to a relay device, a telephone system, a relay program product, and a computer-readable recording medium recording a relay program that are used by a videophone subscriber.

BACKGROUND ART

Videophone service with which not only voice and sound but also video image can be communicated has started. Patent Document 1 discloses a function to differently sound a ringing tone in a communication terminal, that includes a line control interface interfacing with a network, an information storage in which personal information of a calling party can be registered, a storage in which audio data can be registered, a CPU (Central Processing Unit) detecting whether a calling party places a call from a videophone or a voice telephone based on a call setting information sent to the line control interface, reading first audio data from the storage in accordance with the detection result, detecting a telephone number of the calling party from the call setting information, checking whether the telephone number of the calling party has been registered in the information storage or not, and reading second audio data from the storage in accordance with the result of checking, a ringing controller sounding the audio data read by the CPU, and an audio output portion outputting voice and sound generated by the ringing controller.

According to the invention disclosed in Japanese Patent Laying-Open No. 2003-289345 (Patent Document 1), in order to have information on the calling party easily recognized, the ringing tones are combined in accordance with the information and sounded successively differently, so that the calling party can instantaneously be identified from a remote location.

Separately from the invention according to Patent Document 1, IP (Internet Protocol) telephone utilizing networks has become widely available. Exemplary devices adapted to the IP telephone service include a terminal used alone or a telephone control device for utilizing the IP telephone service. Such a telephone control device includes a router adapted to the IP telephone service or an adapter. These telephone control devices are used by being connected to existing plain old telephone or IP telephone set.

Patent Document 1: Japanese Patent Laying-Open No. 2003-289345

DISCLOSURE OF THE INVENTION

Problems to be Solved by the Invention

The invention disclosed in Patent Document 1 described previously hardly assumes such a case that a plurality of telephone sets can receive a call from a calling party. In particular, it does not at all assume such a case that a call from a calling party is a videophone call and a plurality of telephone sets can receive this call. If the plurality of telephone sets can receive a call from a calling party, a user often does not know which telephone set should be used to receive the call.

The present invention was made to solve the above-described problems, and an object of the present invention is to provide a relay device, a telephone system, a relay program product, and a computer-readable recording medium recording a relay program allowing a user to readily determine which telephone set is to be used to receive a call when a plurality of telephone sets can receive a call from a calling party.

Means for Solving the Problems

In order to achieve the object above, according to one aspect of the present invention, a relay device includes an external communication portion, an internal communication portion, and a controller. The external communication portion communicates with an external telephone set. The internal communication portion communicates with an internal telephone set. The controller controls the internal communication portion such that type information in accordance with a type of information to be communicated with the external telephone set is transmitted when the external communication portion receives information. The controller includes a generator and a communication controller. The generator generates the type information based on the information received by the external communication portion. The communication controller controls the internal communication portion such that the type information is transmitted to the internal telephone set.

In addition, the internal communication portion described above desirably includes a unit communicating with a plurality of internal telephone sets. Moreover, the communication controller desirably includes a unit controlling the internal communication portion such that the type information is transmitted to a destination telephone set representing any of the plurality of internal telephone sets.

In addition, the internal communication portion described above desirably includes a unit communicating with a plurality of internal telephone sets. Moreover, the generator desirably includes a unit generating the type information based on the information received by the external communication portion, that specifies the type of information to be communicated and a telephone number of the external telephone set. Moreover, the communication controller desirably includes a unit controlling the internal communication portion such that the type information is transmitted to a destination telephone set representing any of the plurality of internal telephone sets as information specifying the telephone number of the external telephone set.

Alternatively, the generator described above desirably includes a unit generating the type information by combining a character string corresponding to the type of information to be communicated with the external telephone set with the telephone number of the external telephone set.

In addition, the relay device described above desirably further includes an input portion through which a user inputs necessity information. The necessity information is information indicating necessity of transmission of the type information. Moreover, the communication controller desirably includes a unit controlling the internal communication portion such that the type information is transmitted when the necessity information indicates necessity of transmission of the type information.

In addition, the internal communication portion described above desirably includes a unit communicating with a plurality of internal telephone sets. Moreover, the relay device desirably further includes a storage storing information indicating whether the internal telephone set is a plain old telephone or not, for each internal telephone set. Moreover, the communication controller desirably includes a unit controlling the internal communication portion such that a ringing signal corresponding to content of the type information is transmitted to a destination telephone set when the information stored in the storage indicates that the destination telephone set representing any of the plurality of internal telephone sets is the plain old telephone.

In addition, the internal communication portion described above desirably includes a unit communicating with a plurality of internal telephone sets. Moreover, the relay device desirably further includes a storage storing information indicating whether the internal telephone set operates as a voice telephone or not, for each internal telephone set. Moreover, the communication controller desirably includes a unit controlling the internal communication portion such that a ringing signal corresponding to content of the type information is transmitted to a destination telephone set when the information stored in the storage indicates that the destination telephone set representing any of the plurality of internal telephone sets operates as a telephone set other than the voice telephone.

Alternatively, the storage described above desirably includes a unit storing information received by the internal communication portion from the internal telephone set, that indicates whether the internal telephone set operates as the voice telephone or not.

In addition, the relay device described above desirably further includes a speaker outputting information as sound. Moreover, the controller desirably further includes a unit controlling the speaker such that the type information is output as sound.

In addition, the relay device described above desirably further includes a display device displaying information as an image. Moreover, the controller desirably further includes a unit controlling the display device to display the type information.

In addition, the relay device described above desirably further includes a speaker and a storage. The speaker outputs information as sound. The storage stores information on the internal telephone set, that indicates whether the internal telephone set operates as a voice telephone or not. Moreover, the communication controller desirably includes a unit controlling the internal communication portion such that a ringing signal corresponding to content of the type information is transmitted to the internal telephone set when the information stored in the storage indicates that the internal telephone set operates as a telephone set other than the voice telephone. Moreover, the controller desirably further includes a unit controlling the speaker such that the type information is output as sound.

In addition, the relay device described above desirably further includes a display device and a storage. The display device displays information as an image. The storage stores information on the internal telephone set, that indicates whether the internal telephone set operates as a voice telephone or not. Moreover, the communication controller desirably includes a unit controlling the internal communication portion such that a ringing signal corresponding to content of the type information is transmitted to the internal telephone set when the information stored in the storage indicates that the internal telephone set operates as a telephone set other than the voice telephone. Moreover, the controller desirably further includes a unit controlling the display device to display the type information.

According to another aspect of the present invention, a telephone system includes a relay device and an internal telephone set. The relay device includes an external communication portion, an internal communication portion, and a controller. The external communication portion communicates with an external telephone set. The internal communication portion communicates with the internal telephone set. The controller controls the internal communication portion such that type information in accordance with a type of information to be communicated with the external telephone set is transmitted when the external communication portion receives information. The controller includes a generator and a communication controller. The generator generates the type information based on the information received by the external communication portion. The communication controller controls the internal communication portion such that the type information is transmitted to the internal telephone set.

In addition, the relay device described above desirably further includes a speaker (54) outputting information as sound. Moreover, the controller desirably further includes a unit controlling the speaker such that the type information is output as sound.

In addition, the relay device described above desirably further includes a display device displaying information as an image. Moreover, the controller desirably further includes a unit controlling the display device to display the type information.

In addition, the internal communication portion described above desirably includes a unit communicating with a plurality of internal telephone sets. Moreover, the relay device desirably further includes a storage storing information indicating whether the internal telephone set operates as a voice telephone or not, for each internal telephone set. Moreover, the communication controller desirably includes a unit controlling the internal communication portion such that a ringing signal corresponding to content of the type information is transmitted to a destination telephone set when the information stored in the storage indicates that the destination telephone set representing any of the plurality of internal telephone sets operates as a telephone set other than the voice telephone.

In addition, the relay device described above desirably further includes a storage and a speaker. The storage stores information on the internal telephone set, that indicates whether the internal telephone set operates as a voice telephone or not. The speaker outputs information as sound. Moreover, the communication controller desirably includes a unit controlling the internal communication portion such that a ringing signal corresponding to content of the type information is transmitted to the internal telephone set when the information stored in the storage indicates that the internal telephone set operates as a telephone set other than the voice telephone. Moreover, the controller desirably further includes a unit controlling the speaker such that the type information is output as sound.

In addition, the relay device described above desirably further includes a storage and a display device. The storage stores information on the internal telephone set, that indicates whether the internal telephone set operates as a voice telephone or not. The display device displays information as an image. Moreover, the communication controller desirably includes a unit controlling the internal communication portion such that a ringing signal corresponding to content of the type information is transmitted to the internal telephone set when the information stored in the storage indicates that the internal telephone set operates as a telephone set other than the voice telephone. Moreover, the controller desirably further includes a unit controlling the display device to display the type information.

According to another aspect of the present invention, a relay program product causes a computer to execute the steps including an external communication step and a transmission step. In the external communication step, the computer communicates with an external telephone set. When information is received in the external communication step, the computer transmits information in accordance with a type of information to be communicated with the external telephone set to an internal telephone set in the transmission step.

According to another aspect of the present invention, a recording medium is a computer-readable recording medium recording a relay program. The relay program causes a computer to execute the steps including an external communication step and a transmission step. In the external communication step, the computer communicates with an external telephone set. When information is received in the external communication step, the computer transmits information in accordance with a type of information to be communicated with the external telephone set to an internal telephone set in the transmission step.

EFFECTS OF THE INVENTION

According to a relay device, a telephone system, a relay program product, and a computer-readable recording medium recording a relay program of the present invention, when a plurality of telephone sets can receive a call from a calling party, a user can readily determine which telephone set is to be used to receive the call.

BRIEF DESCRIPTION OF THE DRAWINGS

FIG. 4 illustrates a format of a packet according to the first embodiment of the present invention.

FIG. 5 shows an exemplary method in SIP.

FIG. 6 shows meaning of response in SIP.

FIG. 7 shows a representative beginning portion of information on session of SDP.

FIG. 8 shows a first format of information in SDP.

FIG. 9 shows a second format of information in SDP.

FIG. 10 shows a third format of information in SDP.

FIG. 14 illustrates an exemplary image displayed on a display according to the second embodiment of the present invention.

FIG. 15 illustrates exemplary class information stored in a memory according to the second embodiment of the present invention.

DESCRIPTION OF THE REFERENCE SIGNS

Figure 1:
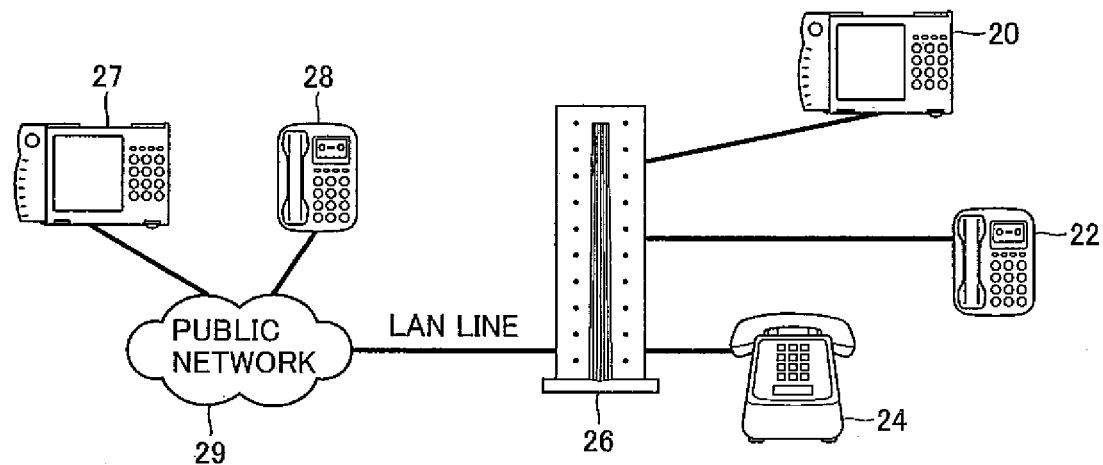
FIG. 1 is a diagram of an overall configuration of an IP telephone system according to a first embodiment of the present invention.

20, 27 videophone set; 22, 28 voice telephone set; 24 plain old telephone set; 26 home gateway; 29 public network; 30 WAN interface portion; 32 WAN controller; 34 LAN interface portion; 36 LAN controller; 38 analog interface portion; 40 analog controller; 42 operation portion; 44 detector; 46 memory; 48 data controller; 50 display; 52 display controller; 54 sound output portion; 56 sound controller; 58 central controller; 59 memory card drive device; 60 capability management table; 62 determination portion; 64 data link layer header; 65 IP header; 66 UDP header; 67 SIP data; and 200 memory card.

BEST MODES FOR CARRYING OUT THE INVENTION

An embodiment of the present invention will be described hereinafter with reference to the drawings. In the description below, the same elements have the same reference characters allotted. Their label and function are also identical. Therefore, detailed description thereof will not be repeated.

First Embodiment

An IP telephone system according to the first embodiment of the present invention will be described hereinafter.

FIG. 1 is a diagram of a configuration of the IP telephone system according to the present embodiment. Referring to FIG. 1, the IP telephone system according to the present embodiment includes a plurality of telephone sets and a home gateway 26 connected to those terminals. The plurality of telephone sets include a not-shown telephone set, in addition to a videophone set 20, a voice telephone set 22, and a plain old telephone set 24. The plurality of telephone sets are telephone sets for placing a call to an external videophone set 27 or a voice telephone set 28 through a public network 29 (in the present embodiment, the type of public network 29 is not particularly limited; for example, a dedicated IP network such as intranet or Internet network are included as examples of public network 29) and home gateway 26. In the description of the present invention, the "plain old telephone set" and the "plain old telephone" refer to a telephone set capable of communication over a communication network other than IP. Home gateway 26 is a relay device relaying communication between each telephone set configuring the IP telephone system according to the present embodiment and the external telephone set.

Figure 2:
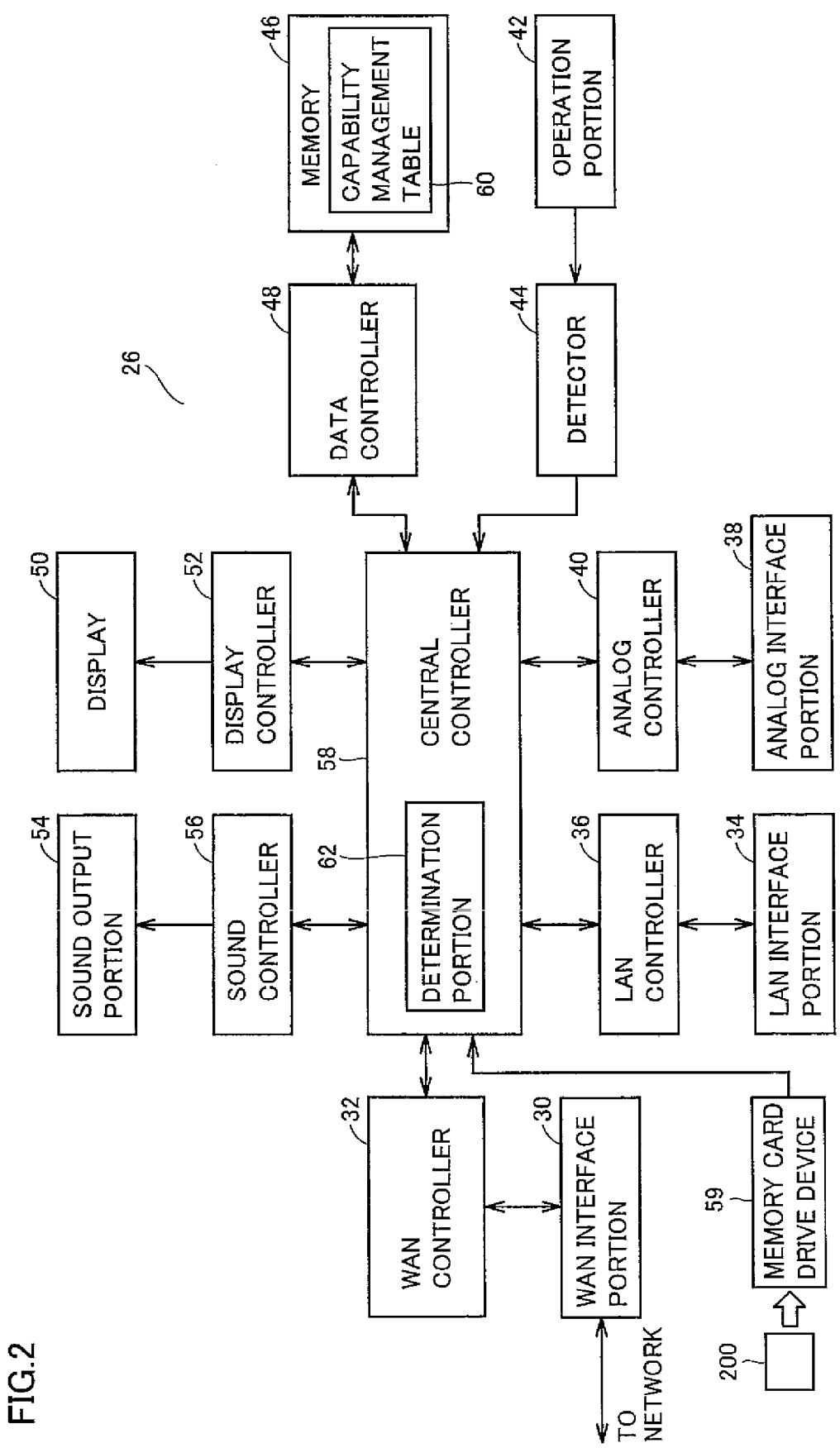
FIG. 2 is a functional block diagram of a home gateway according to the first embodiment of the present invention.

FIG. 2 is a functional block diagram of home gateway 26 according to the present embodiment. Referring to FIG. 2, home gateway 26 according to the present embodiment includes a WAN (Wide Area Network) interface portion 30, a WAN controller 32, a LAN (Local Area Network) interface portion 34, a LAN controller 36, an analog interface portion 38, an analog controller 40, an operation portion 42, a detector 44, a memory 46, a data controller 48, a display 50, a display controller 52, a sound output portion 54, a sound controller 56, a central controller 58, and a memory card drive device 59. WAN interface portion 30 communicates with an external telephone set through public network 29. In the present embodiment, the external telephone set refers to videophone set 27 or voice telephone set 28. WAN controller 32 relays communication between WAN interface portion 30 and central controller 58. WAN controller 32 also serves as a portion controlling WAN interface portion 30. LAN interface portion 34 communicates with videophone set 20 and voice telephone set 22. In the present embodiment, videophone set 20 and voice telephone set 22 are both IP telephone. LAN controller 36 relays communication between LAN interface portion 34 and central controller 58. LAN controller 36 also serves as a portion controlling LAN interface portion 34. Analog interface portion 38 communicates with plain old telephone set 24. Thus, LAN interface portion 34 and analog interface portion 38 configure a communication device communicating with a plurality of telephone sets. Analog controller 40 relays communication between analog interface portion 38 and central controller 58. Analog controller 40 also serves as a portion controlling analog interface portion 38. Operation portion 42 is a portion that a user operates to input a command and information. Detector 44 is a portion detecting a user's command for operation portion 42. Memory 46 stores information. Data controller 48 is a portion writing information into memory 46 and reading information from memory 46. Display 50 serves as a display device displaying information as an image on a display that is mounted. Display 50 also serves as a portion giving notification to the user through an indicator that is mounted. Display controller 52 relays information from central controller 58 to display 50. Display controller 52 also serves as a portion controlling display 50 under control of central controller 58. Sound output portion 54 is a portion outputting information as sound, by including a speaker. Sound controller 56 is a portion relaying information output by central controller 58 to sound output portion 54. Sound controller 56 also serves as a portion controlling sound output portion 54. Central controller 58 is a portion controlling each portion in home gateway 26 according to the present embodiment. Memory card drive device 59 is a device reading a program from a memory card 200.

Memory 46 stores a capability management table 60. Capability management table 60 is a data table storing information indicating whether each of the plurality of telephone sets described above is a voice telephone or not, or the like.

Central controller 58 includes a determination portion 62. Determination portion 62 is a portion determining whether videophone set 27 or voice telephone set 28 is a voice telephone or not.

Home gateway 26 according to the present embodiment is implemented by hardware of home gateway 26 and software executed by central controller 58. In general, such software is distributed in a manner stored in a recording medium such as memory card 200, and it is read from the recording medium by memory card drive device 59 or the like and once stored in memory 46 or the like. In addition, the software is executed by central controller 58 described above. The hardware itself of home gateway 26 described above is common. Therefore, the most essential part of the present invention resides in a program recorded on a recording medium such as memory card 200. As an operation of home gateway 26 itself is well known, detailed description thereof will not be repeated here.

Figure 3:
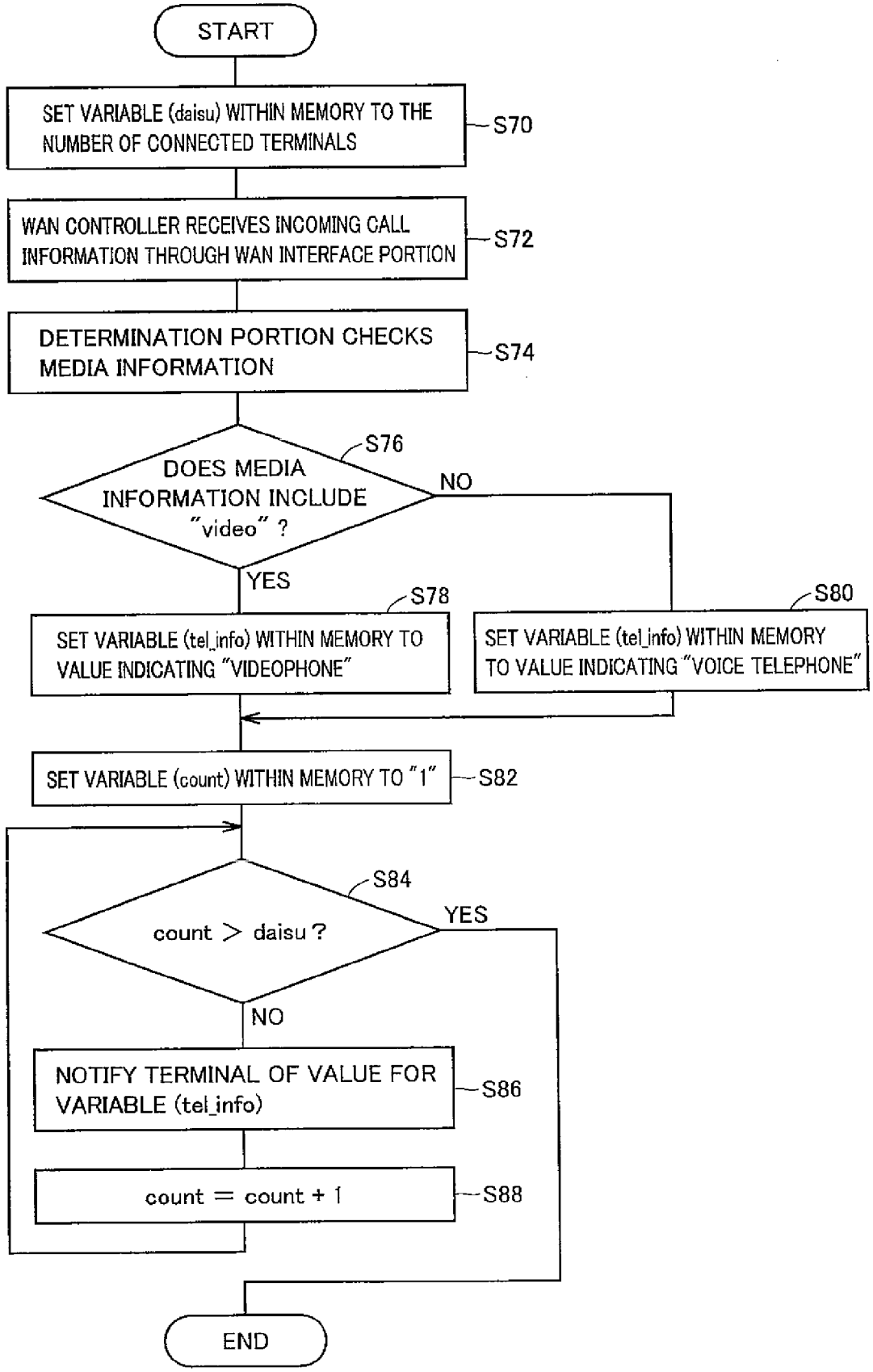
FIG. 3 is a flowchart showing a procedure for controlling notification processing of a type according to the first embodiment of the present invention.

Referring to FIG. 3, the program executed in home gateway 26 carries out the following control, in connection with notification of a type.

In step S70, data controller 48 causes memory 46 to store the number of telephone sets that can receive a call, under control of central controller 58. Memory 46 stores the number as a value for variable daisu. In the present embodiment, the number matches with the number of the plurality of telephone sets described above.

In step S72, WAN interface portion 30 receives incoming call information. WAN interface portion 30 outputs the received incoming call information to central controller 58 through WAN controller 32. In step S74, determination portion 62 of central controller 58 reads a type of information transmitted by a caller telephone set based on media information.

FIG. 4 illustrates a format of a packet used in communication by WAN interface portion 30 and LAN interface portion 34 in the present embodiment. In the present embodiment, each of those packets communicates information in accordance with SIP (Session Initiation Protocol) and SDP (Session Description Protocol) or RTP (Real-time Transport Protocol). Where information is communicated in accordance with SIP or SDP, each of those packets includes a data link layer header 64, an IP header 65, a UDP header 66, and SIP data 67. Data link layer header 64 is data for communicating a packet through a LAN interface device within LAN or WAN. IP header 65 is data defining a destination of data. UDP header 66 is data defining a communication port. SIP data 67 is various types of data in accordance with SIP and SDP. Since a format of a packet when information is communicated in accordance with RTP is well known, description of the format is not provided here.

SIP is a communication protocol exchanged on a text basis. SIP is also a protocol involved with start or end of a series of communication procedures. SIP is characterized by a control command called "method" and a reply called "response". FIG. 5 shows an exemplary method. FIG. 6 shows meaning of a response. The data communicated in accordance with SIP also includes a telephone number of a caller.

SDP is a protocol operating in coordination with SIP, with information being added to the method or the response of SIP. SDP is also a protocol defining how and in which format multimedia data such as music or video image should be exchanged. The information to be added to the method or the response is information on session. The "session" refers to a unit representing a group of communication that can be distinguished from other communication as a series of communication procedures. The "information on session" includes a time for identifying each session, an effective time of a session, or information on a class of media communicated in one session. FIG. 7 shows a representative beginning portion of information on session.

As shown in FIG. 7, in SDP, the information on a class of media, that is, media information, is included in a character string beginning with "m=". The character string beginning with "m=" represents a class of media, a port number, a transport protocol, and a media format list. In the case of SDP, the class of media is represented by any character string of "audio", "video", "application", "data", and "control". In the present embodiment, the class of media for data included in a packet to be communicated includes any of "audio" and "video" without exception. The port number represents a number of a port at which media are received. The transport protocol represents a format of a packet. The transport protocol is expressed by any character string of "RTP/AVP" and "udp". "RTP/AVP" is included when an RTP packet complying with RFC (Request For Comments) 1890 is used, and "udp" is included when a packet in a format other than the former is used. The media format list represents a type of payload defined under RFC1890. The type of payload represents a name of an encoding method, a clock rate, and the number of channels. FIG. 8 shows information represented by the character string beginning with "m=".

An attribute of a packet complying with RTP is included in a character string beginning with "a=rtpmap:". The character string beginning with "a=rtpmap:" represents a payload type and a name of an encoding method or a clock rate. FIG. 9 shows a format of information represented by the character string beginning with "a=rtpmap:".

A parameter specific to media is included in a character string beginning with "a=fmtp:". The character string beginning with "a=fmtp:" represents a payload type of a format and a parameter used in media designated with the format. FIG. 10 shows a format of information represented by the character string beginning with "a=fmtp:".

In step S76, determination portion 62 determines whether the media information includes "video" or not. If it is determined that the media information includes "video" (YES in step S76), the process proceeds to step S78. Otherwise (NO in step S76), the process proceeds to step S80.

In step S78, data controller 48 causes memory 46 to store a value indicating that a type of a caller telephone is the videophone, under control of central controller 58. In the present embodiment, memory 46 stores information specifying the caller telephone set as a value for a variable tel_info. In the present embodiment, a value indicating that the type of the caller telephone is the videophone is "1".

In step S80, data controller 48 causes memory 46 to store a value indicating that the type of the caller telephone set is the voice telephone (a value indicating that video image information is not included in information communicated with the caller telephone set), under control of central controller 58. Memory 46 stores the information as a value for variable tel_info. In the present embodiment, a value indicating that the type of the caller telephone is the voice telephone is "0". Through step S76, step S78, and step S80, central controller 58 generates information corresponding to the type of information communicated with the caller telephone set, based on the information received by WAN interface portion 30.

In step S82, data controller 48 causes memory 46 to store "1" as a value for a variable count, under the control of central controller 58.

In step S84, data controller 48 reads the values for variable count and variable daisu from memory 46, under the control of central controller 58. Data controller 48 outputs the values read from memory 46 to central controller 58. Determination portion 62 of central controller 58 determines whether the value for variable count is greater than the value for variable daisu. If the value for variable count is determined as greater than the value for variable daisu (YES in step S84), the process ends. Otherwise (NO in step S84), the process proceeds to step S86.

In step S86, LAN interface portion 34 or analog interface portion 38 transmits the value for variable tel_info to the telephone set corresponding to variable count, among the telephone sets connected to respective these portions, under the control of LAN controller 36 or analog controller 40. Thus, a device set including LAN controller 36 and analog controller 40 controls LAN interface portion 34 and analog interface portion 38 such that information corresponding to the type of information to be communicated with the caller telephone set is transmitted to any of the plurality of telephone sets configuring the IP telephone system according to the present embodiment.

In step S88, data controller 48 increments the value for variable count stored in memory 46 by "1" under the control of central controller 58.

An operation of the IP telephone system based on the structure and the flowchart as above will now be described.

[Example where a Call Arrives from a Videophone]

Data controller 48 causes memory 46 to store the number of telephone sets that can receive a call, under the control of central controller 58 (step S70).

Figure 11:
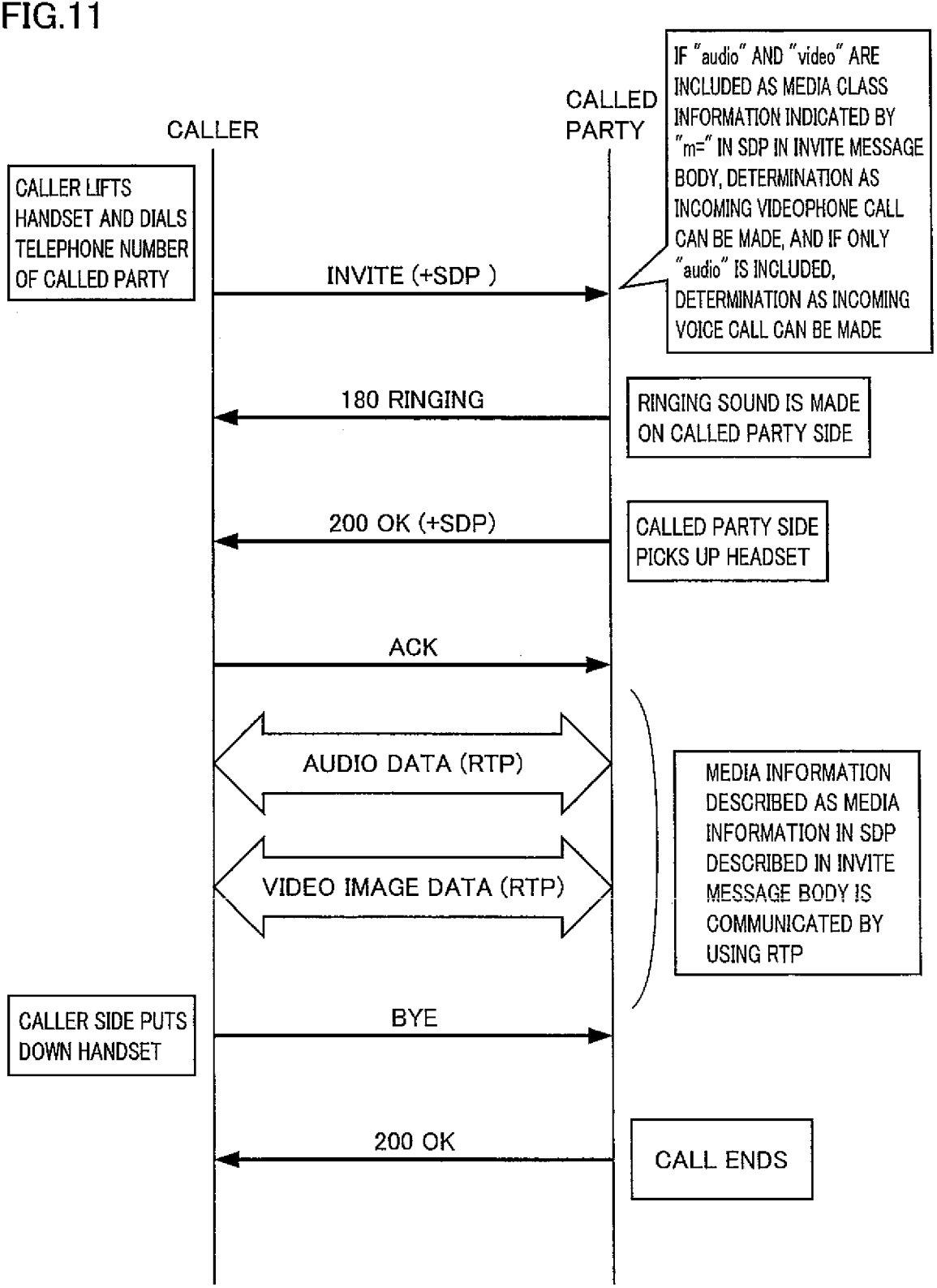
FIG. 11 illustrates exchange of a packet in the IP telephone system according to the first embodiment of the present invention.

It is assumed that, after the number of telephone sets is stored, a call was made from the caller telephone set to the IP telephone system according to the present embodiment. WAN interface portion 30 receives incoming call information (step S72). FIG. 11 illustrates exchange of a packet in a call of 1 session. "INVITE (+SDP)" in FIG. 11 represents communication of the incoming call information from the caller telephone set to WAN interface portion 30. When the incoming call information is received, determination portion 62 of central controller 58 reads the type of information transmitted by the caller telephone set based on the media information (step S74).

When the type of the information is read, determination portion 62 determines whether the media information includes "video" or not (step S76). When a call was placed from a videophone, determination portion 62 determines that the media information includes "video" (YES in step S76), and therefore, data controller 48 causes memory 46 to store a value indicating that the type of the caller telephone is the videophone, under the control of central controller 58 (step S78). When the value is stored, data controller 48 causes memory 46 to store "1" as the value for variable count under the control of central controller 58 (step S82).

When the value for variable count is stored, determination portion 62 of central controller 58 determines whether the value for variable count is greater than the value for variable daisu (step S84). Here, as the value for variable count is not greater than the value for variable daisu (NO in step S84), LAN interface portion 34 or analog interface portion 38 transmits the value for variable tel_info to the telephone set corresponding to variable count, among the telephone sets connected to respective these portions, under the control of LAN controller 36 or analog controller 40 (step S86). As the value for variable tel_info is transmitted, the telephone set corresponding to variable count can notify the user of the fact that the originator telephone set is the videophone.

When the value is transmitted, data controller 48 increments the value for variable count stored in memory 46 by "1", under the control of central controller 58 (step S88). Thereafter, when the value for variable count exceeds the value for variable daisu (YES in step S84) after the processing from step S84 to step S88 is repeated, processing for notification of the type of the telephone set (strictly speaking, the type of information to be communicated between the telephone sets) ends. Thereafter, communication shown in FIG. 11 is continued.

[Example where a Call Arrives from a Voice Telephone]

After the processing until step S74, determination portion 62 determines whether the media information includes "video" or not (step S76). Here, as it is determined that the media information does not include "video" (NO in step S76), data controller 48 causes memory 46 to store the value indicating that the type of the caller telephone set is the voice telephone, under the control of central controller 58 (step S80).

When the value is stored, after the processing from step S82 to step S84, LAN interface portion 34 or analog interface portion 38 transmits the value for variable tel_info to the telephone set corresponding to variable count, among the telephone sets connected to respective these portions, under the control of LAN controller 36 or analog controller 40 (step S86). Thus, when WAN interface portion 30 receives information, the device including LAN interface portion 34, LAN controller 36, analog interface portion 38, analog controller 40, and data controller 48 outputs the information in accordance with the type of the information communicated with the caller telephone set. The telephone set corresponding to count can notify the user that the originator telephone set is the voice telephone, as the value for variable tel_info is transmitted.

As described above, the home gateway according to the present embodiment can notify the telephone set whether the caller telephone set is the videophone or the voice telephone (strictly speaking, whether the telephone set operates as the videophone or as the voice telephone). Consequently, each telephone set receiving a call can notify the user of the type of the caller telephone set (strictly speaking, whether the telephone set operates as the videophone or as the voice telephone). Examples of a specific method for notifying the user of the type of the telephone set include a method of turning on an indicator mounted in advance, in accordance with the received information. Other methods may be adopted as the specific method for notifying the user of the type of the telephone set. As the user is notified of such information on the type, when a plurality of telephone sets can receive a call from a calling party, the user can readily determine which telephone set is to be used to receive the call. Such a problem that only voice and sound is communicated caused by responding to an incoming call from a videophone with a voice telephone, or such a problem that a video image that the user does not want to show is displayed when a call arrives from a videophone can be avoided.

According to a variation, home gateway 26 may notify the user whether the originator telephone set is the videophone or the voice telephone, by using an indicator on display 50 (here, display 50 is assumed to include an indicator). Home gateway 26 may notify the user whether the originator telephone set is the videophone or the voice telephone, based on output from sound output portion 54, instead of or in addition to the indicator on display 50. Thus, for example, when there is an incoming videophone call, the user can be prevented from inadvertently receiving the call with the telephone set incapable of handling a videophone call but capable of handling only a voice call.

In addition, the specifications with which LAN interface portion 34 complies during communication are not particularly limited. Such specifications with which LAN interface portion 34 can comply include not only Ethernet (registered trademark) but also IEEE (the Institute of Electrical and Electronic Engineers) 802.11a and IEEE 802.11b/11g.

In addition, home gateway 26 may be a part of a telephone set. Here, the IP telephone system described above includes at least one telephone set and a telephone set having home gateway 26. Each of display 50 and sound output portion 54 of home gateway 26 operates as a part of the telephone set. Here, a set of portions including LAN controller 36 and analog controller 40 controls LAN interface portion 34 and analog interface portion 38 such that the information corresponding to the type of information to be communicated with the caller telephone set is transmitted to the telephone set configuring the IP telephone system according to the present embodiment. Moreover, central controller 58 controls sound output portion 54 represented by the speaker such that the information corresponding to the type of information to be communicated with the caller telephone set is output as voice and sound, or central controller 58 controls display 50 such that the information corresponding to the type of information to be communicated with the caller telephone set is displayed.

Second Embodiment

An IP telephone system according to the second embodiment of the present invention will be described hereinafter.

The hardware configuration of each device configuring the IP telephone system according to the present embodiment is the same as in the first embodiment described previously, and the function thereof is also the same. Therefore, detailed description thereof will not be repeated here.

Figure 12:
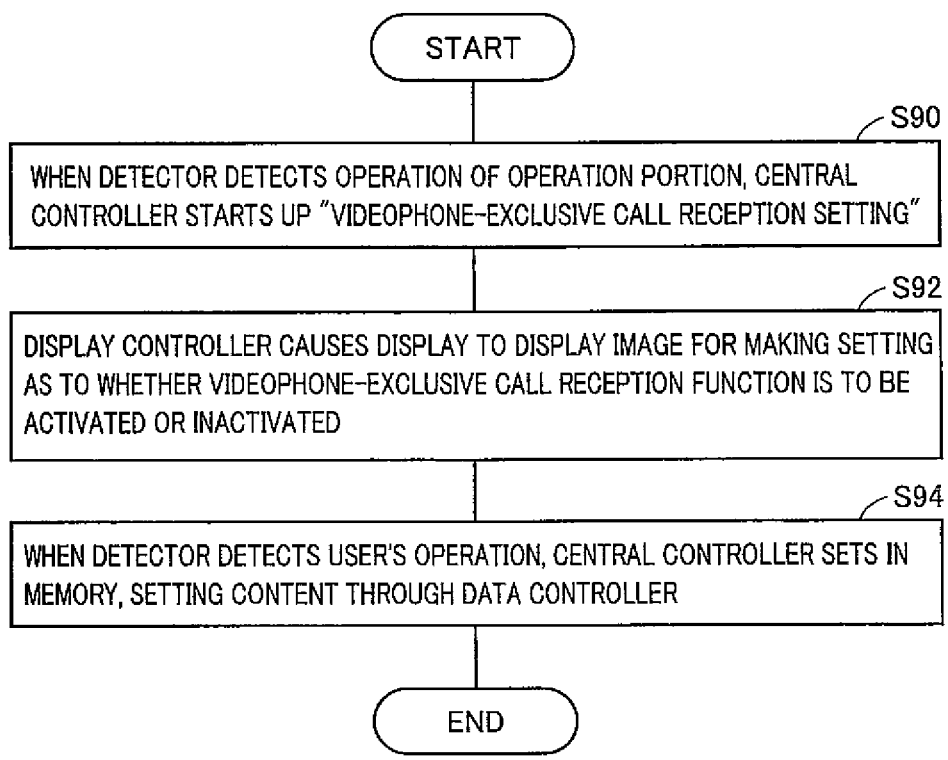
FIG. 12 is a flowchart showing a procedure for controlling videophone-exclusive call reception setting processing according to a second embodiment of the present invention.

Referring to FIG. 12, a program executed in home gateway 26 carries out the following control, in connection with setting relating to an incoming call.

In step S90, when detector 44 detects a user's operation of operation portion 42, detector 44 outputs to central controller 58, information specifying the content of the user's operation of operation portion 42. Central controller 58 starts up "videophone-exclusive call reception setting." Start-up of "videophone-exclusive call reception setting" refers to the feature that central controller 58 controls each portion configuring home gateway 26 such that only videophone set 20 among the telephone sets configuring the IP telephone system can receive a call when there is a call from external videophone set 27.

In step S92, display controller 52 causes display 50 to display an image for setting whether a videophone-exclusive call reception function should be activated or inactivated, under the control of central controller 58.

In step S94, when detector 44 detects the user's operation of operation portion 42, detector 44 outputs information specifying the content of the user's operation to central controller 58. Central controller 58 causes memory 46 to store the information corresponding to the content of the information output by detector 44. In this step, the information stored in memory 46 is the information indicating whether the videophone-exclusive call reception function is active or not.

Figure 13:
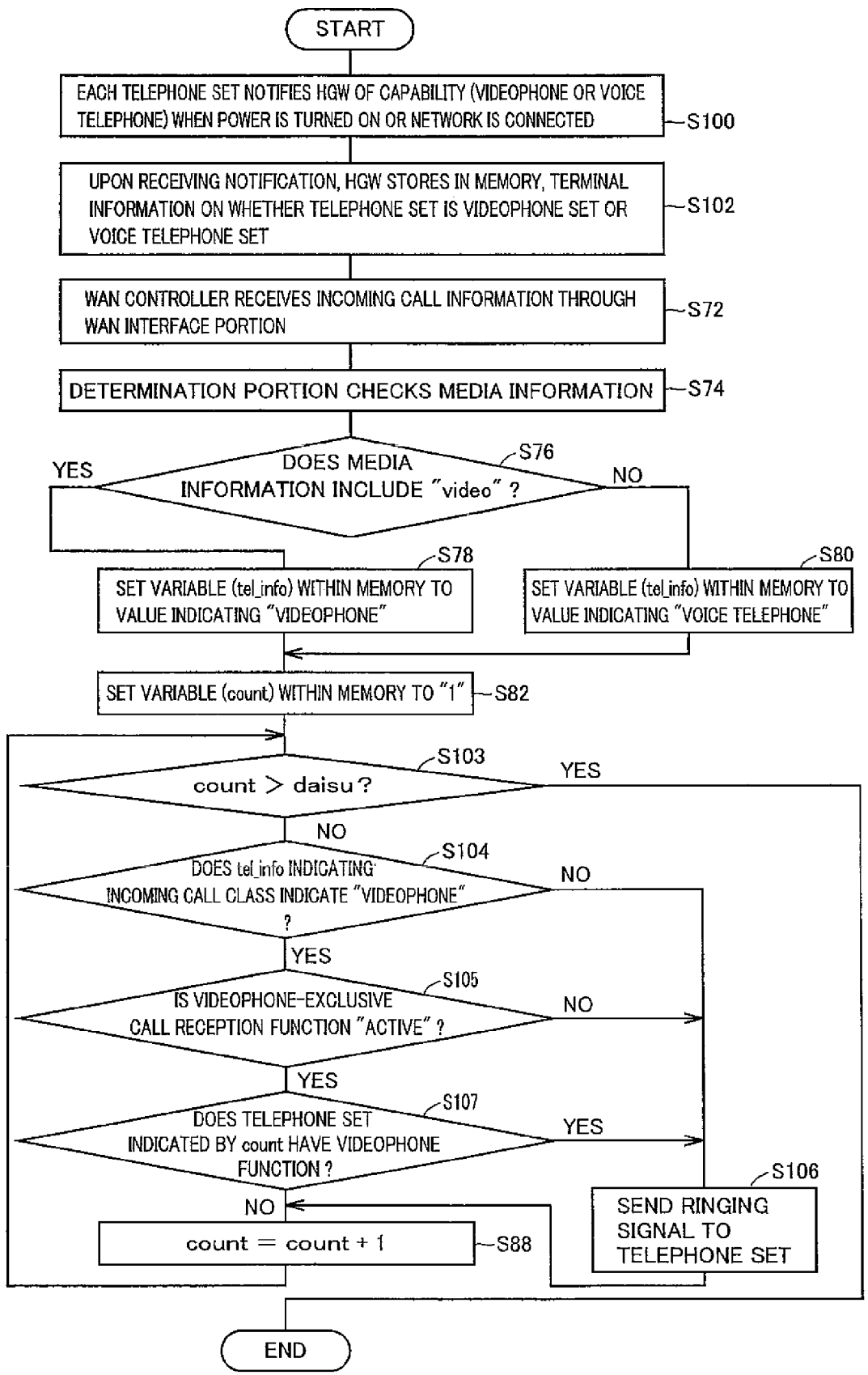
FIG. 13 is a flowchart showing a procedure for controlling processing for sending a ringing signal according to the second embodiment of the present invention.

Referring to FIG. 13, a program executed in home gateway 26 carries out the following control, in connection with sending of a ringing signal. It is noted that the processing in the flowchart shown in FIG. 13 the same as that previously shown in FIG. 3 has the same step number allotted and the processing is also the same. Therefore, detailed description thereof will not be repeated here.

In step S100, LAN interface portion 34 and analog interface portion 38 receive information specifying a function of each telephone set from the plurality of telephone sets configuring the IP telephone system according to the present embodiment. The information specifying the function of each telephone set is also the information indicating whether the telephone set operates as the voice telephone or not. In the present embodiment, however, the "information specifying the function of each telephone set" indicates whether the telephone set operates as the voice telephone or as the videophone. LAN interface portion 34 and analog interface portion 38 output the received information to central controller 58.

In step S102, central controller 58 causes memory 46 to store the information received by LAN interface portion 34 and analog interface portion 38 through data controller 48. Such information is stored as a part of capability management table 60. Thus, memory 46 stores the information indicating whether the telephone set operates as the voice telephone or not, for each of the plurality of telephone sets configuring the IP telephone system according to the present embodiment. Moreover, data controller 48 causes memory 46 to store the number of telephone sets that can receive an external call, under control of central controller 58.

In step S103, data controller 48 reads the values for variable count and variable daisu from memory 46, under the control of central controller 58. Data controller 48 outputs the values read from memory 46 to central controller 58. Determination portion 62 of central controller 58 determines whether the value for variable count is greater than the value for variable daisu. If the value for variable count is determined as greater than the value for variable daisu (YES in step S103), the process ends. Otherwise (NO in step S103), the process proceeds to step S104.

In step S104, determination portion 62 determines whether the value for information tel_info stored in memory 46 is the value indicating "videophone". If the value for information tel_info is determined as the value indicating "videophone" (YES in step S104), the process proceeds to step S105. Otherwise (NO in step S104), the process proceeds to step S106.

In step S105, determination portion 62 determines whether the videophone-exclusive call reception function is active or not. Determination portion 62 determines whether the videophone-exclusive call reception function is active or not, based on the information stored in memory 46. If it is determined that the videophone-exclusive call reception function is active (YES in step S105), the process proceeds to step S107. Otherwise (NO in step S105), the process proceeds to step S106.

In step S106, LAN interface portion 34 or analog interface portion 38 transmits a ringing signal under the control of LAN controller 36 or analog controller 40. In the present embodiment, a type of the ringing signal corresponds to the value for variable tel_info.

In step S107, determination portion 62 determines whether the telephone set corresponding to the value for variable count has a function as the videophone. Determination portion 62 determines whether the telephone set corresponding to the value for variable count has a function as the videophone based on capability management table 60. If it is determined that the telephone set has the function as the videophone (YES in step S107), the process proceeds to step S106. Otherwise (NO in step S107), the process proceeds to step S88.

An operation of home gateway 26 based on the structure and the flowchart as above will now be described.

When detector 44 detects a user's operation of operation portion 42, central controller 58 starts up "videophone-exclusive call reception setting" (step S90). When the "videophone-exclusive call reception setting" is started up, display controller 52 causes display 50 to display an image for making setting as to whether a videophone-exclusive call reception function should be activated or inactivated, under the control of central controller 58 (step S92). FIG. 14 illustrates an image displayed on display 50.

When the image is displayed, detector 44 detects the user's operation of operation portion 42. When the user's operation is detected, detector 44 outputs the information specifying the content of the user's operation to central controller 58. Central controller 58 causes memory 46 to store data corresponding to the content of the information output by detector 44 (step S94). Here, as shown in FIG. 14, it is assumed that, since an operation to activate the videophone-exclusive call reception function has been performed, the information indicating that the videophone-exclusive call reception function is active is stored.

After the data is stored (the processing from step S90 to step S94 is not necessary if memory 46 has stored an appropriate initial value, however, it is assumed here that memory 46 has not stored such an initial value), LAN interface portion 34 and analog interface portion 38 receive information specifying a function of each telephone set from the plurality of telephone sets configuring the IP telephone system. LAN interface portion 34 and analog interface portion 38 output the received information to central controller 58 (step S100). When the information is output, data controller 48 causes memory 46 to store class information and the number of telephone sets capable of receiving an external call, under the control of central controller 58 (step S102). The "class information" refers to information specifying a function possessed by a telephone set. FIG. 15 illustrates the class information stored in memory 46 in this step.

When the information or the like is stored, after the processing from step S72 to step S82, determination portion 62 determines whether the value for variable count is greater than the value for variable daisu (step S103). As the value for variable count is still smaller than the value for variable daisu (NO in step S103), determination portion 62 determines whether the value for information tel_info stored in memory 46 is the value indicating "videophone" (step S104). Here, if it is assumed that the value for information tel_info has a value indicating "videophone" (YES in step S104), determination portion 62 determines whether the videophone-exclusive call reception function is active or not (step S105). Here, as the videophone-exclusive call reception function is active (YES in step S105), determination portion 62 determines whether the telephone set corresponding to the value for variable count has a function as the videophone (step S107). If it is assumed that the telephone set corresponding to the value for variable count has the function as the videophone (YES in step S107), LAN interface portion 34 or analog interface portion 38 transmits a ringing signal under the control of LAN controller 36 or analog controller 40 (step S106). Thus, LAN interface portion 34 or analog interface portion 38 controls LAN interface portion 34 or analog interface portion 38 such that a ringing signal corresponding to the content of the type information is transmitted to a destination telephone set when the destination telephone set representing any of the plurality of telephone sets configuring the IP telephone system according to the present embodiment operates as the telephone set other than a voice telephone.

After the ringing signal is transmitted and after the processing in step S88 and step S103, determination portion 62 determines whether the value for information tel_info stored in memory 46 is the value indicating "videophone" (step S104). Here, if it is assumed that the value for information tel_info has the value indicating the voice telephone (NO in step S104), the processing in step S106 and step S88 is performed, and thereafter the processing from step S103 to step S88 is repeated.

As described above, according to the IP telephone system of the present embodiment, by managing functions of the telephone sets stored in advance (the videophone or the voice telephone), for example when a call is made from a videophone, a telephone set not having a videophone function is not notified of an incoming call. Thus, such a failure that a call from a videophone is inadvertently received by a voice telephone can be prevented. Such a failure that a video image that the user does not want to show is displayed when a call arrives from a videophone can also be avoided. Consequently, a home gateway and an IP telephone system allowing a user to readily and reliably determine which telephone set is to be used to receive a call when a plurality of telephone sets can receive a call from a calling party, in particular when a voice telephone also can receive a call from a calling party, can be provided.

In addition, the home gateway and the telephone set communicate with each other in advance, so that the home gateway can store the information specifying the function of the telephone set without user's setting in advance. Consequently, a home gateway and an IP telephone system allowing a user to readily and reliably determine, without a special operation, which telephone set is to be used to receive a call when a plurality of telephone sets can receive a call from a calling party, can be provided.

In addition, according to a variation, home gateway 26 may be a part of a telephone set. Here, the IP telephone system described above includes at least one telephone set and a telephone set having home gateway 26. Each of display 50 and sound output portion 54 of home gateway 26 operates as a part of the telephone set. Here, central controller 58 controls sound output portion 54 represented by the speaker, such that the ringing signal corresponding to the content of the type information is output as sound. Alternatively, central controller 58 controls display 50 such that the information corresponding to the type of information to be communicated with the caller telephone set is displayed.

Third Embodiment

An IP telephone system according to the third embodiment of the present invention will be described hereinafter.

The hardware configuration of each device configuring the IP telephone system according to the present embodiment is the same as in the first embodiment described previously and the function thereof is also the same. Therefore, detailed description thereof will not be repeated here.

Figure 16:
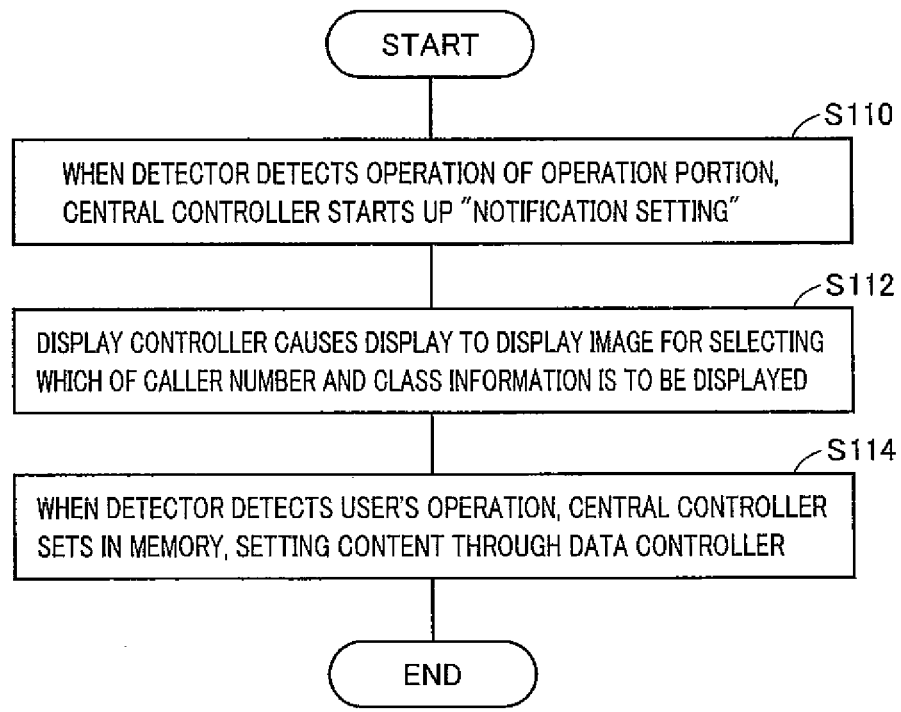
FIG. 16 is a flowchart showing a procedure for controlling notification setting processing according to a third embodiment of the present invention.

Referring to FIG. 16, a program executed in home gateway 26 carries out the following control, in connection with notification setting.

In step S110, when detector 44 detects a user's operation of operation portion 42, detector 44 outputs to central controller 58, information on the content of the user's operation of operation portion 42. Central controller 58 starts up "notification setting". Start-up of "notification setting" refers to control by central controller 58 of each portion configuring home gateway 26 for the following purpose. Specifically, the purpose is to communicate to each telephone set, information indicating whether the caller telephone set is the videophone or the voice telephone. In the present embodiment, each telephone set displays such information by using a number display (registered trademark) function.

In step S112, display controller 52 causes display 50 to display an image for "notification setting" under the control of central controller 58.

In step S114, the user inputs the information specifying the content of "notification setting" through operation portion 42. In the present embodiment, the information specifying the content of "notification setting" indicates whether transmission of information corresponding to the type of information to be communicated with the caller telephone set is necessary or not. When detector 44 detects the user's operation of operation portion 42, central controller 58 causes memory 46 to store the information specifying the content of "notification setting", based on the content of the user's operation.

Figure 17:
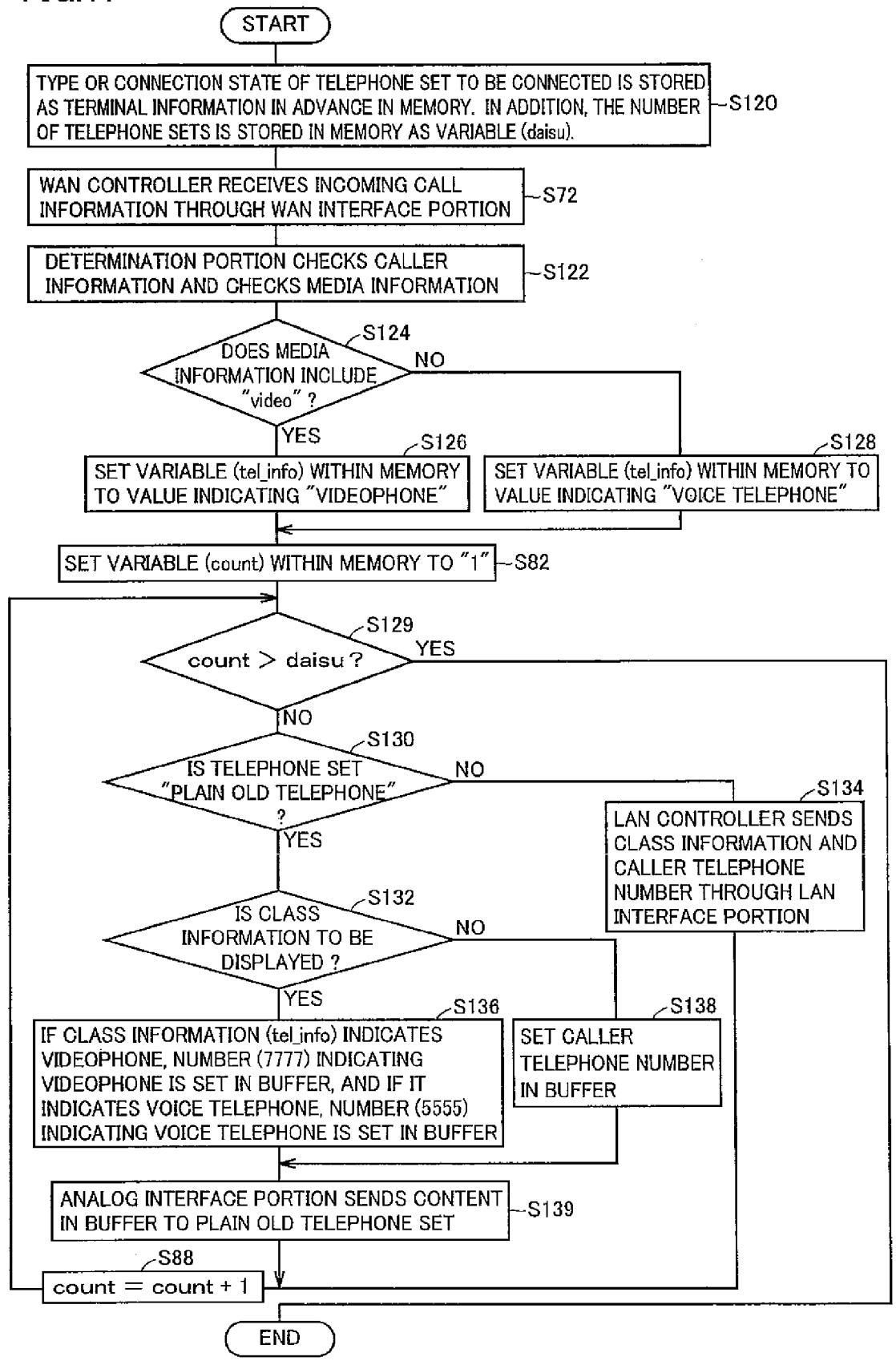
FIG. 17 is a flowchart showing a procedure for controlling processing for sending class information according to the third embodiment of the present invention.

Referring to FIG. 17, a program executed in home gateway 26 carries out the following control, in connection with sending of the class information. It is noted that the processing in the flowchart shown in FIG. 17 the same as that previously shown in FIG. 3 has the same step number allotted and the processing is also the same. Therefore, detailed description thereof will not be repeated here.

In step S120, memory 46 stores as terminal information, the type or a connection state of each telephone set configuring the IP telephone system according to the present embodiment. Memory 46 stores the terminal information as a part of capability management table 60. Thus, memory 46 stores the information on whether the telephone set is the plain old telephone set or not, for each telephone set configuring the IP telephone system according to the present embodiment. In the present embodiment, it is assumed that data controller 48 causes memory 46 to store the terminal information in response to the user's operation of operation portion 42, under the control of central controller 58. Moreover, memory 46 stores the number of telephone sets. The number of telephone sets stored in memory 46 is the number of telephone sets configuring the IP telephone system according to the present embodiment. Memory 46 stores this value as the value for variable daisu.

In step S122, determination portion 62 identifies information specifying a caller telephone number and media information. The caller telephone number and the media information are included in SIP data 67. Data controller 48 causes memory 46 to store the information specifying the caller telephone number.

In step S124, determination portion 62 determines whether the media information includes "video" or not. If it is determined that the media information includes "video" (YES in step S124), the process proceeds to step S126. Otherwise (NO in step S124), the process proceeds to step S128.

In step S126, data controller 48 causes memory 46 to store a value indicating that a type of a caller telephone is the videophone, under the control of central controller 58. In the present embodiment, memory 46 stores information specifying the caller telephone set as a value for a variable tel_info.

In step S128, data controller 48 causes memory 46 to store a value indicating that the type of the caller telephone set is the voice telephone (video image information is not included in information communicated with the caller telephone set), under the control of central controller 58. Memory 46 stores the information as a value for variable tel_info. Through step S124, step S126, and step S128, central controller 58 generates information corresponding to the type of information to be communicated with the caller telephone set. Central controller 58 generates such information based on the information received by WAN interface portion 30 in step S72. The information received by WAN interface portion 30 in step S72 is the information specifying the type of information to be communicated and the telephone number.

In step S129, data controller 48 reads the values for variable count and variable daisu from memory 46, under the control of central controller 58. Data controller 48 outputs the values read from memory 46 to central controller 58. Determination portion 62 of central controller 58 determines whether the value for variable count is greater than the value for variable daisu. If the value for variable count is determined as greater than the value for variable daisu (YES in step S129), the process ends. Otherwise (NO in step S129), the process proceeds to step S130.

In step S130, determination portion 62 determines whether the telephone set corresponding to variable count is the plain old telephone set or not. If determination as the plain old telephone set is made (YES in step S130), the process proceeds to step S132. Otherwise (NO in S130), the process proceeds to step S134.

In step S132, determination portion 62 determines whether the class information should be displayed in addition to the telephone number of the caller, based on the information specifying the content of the "notification setting" stored in memory 46. If it is determined that the class information is to be displayed (YES in step S132), the process proceeds to step S136. Otherwise (NO in step S132), the process proceeds to step S138. Thus, analog controller 40 controls analog interface portion 38 such that the information corresponding to the type of the information to be communicated with the caller telephone set is transmitted, in the following case. Specifically, as will be described later, the case is such that transmission of the information corresponding to the type of the information to be communicated with the caller telephone set is necessary. Analog controller 40 can determine whether transmission of the information corresponding to the type of the information to be communicated with the caller telephone set is necessary or not, based on the information specifying the content of the "notification setting".

In step S134, LAN controller 36 controls LAN interface portion 34 such that the class information and the telephone number of the caller telephone set are transmitted, under the control of central controller 58.

In step S136, if a value for the class information indicates that the telephone set has a videophone function, central controller 58 causes the buffer of analog controller 40 to store data of a character string "7777". In the present embodiment, "7777" is a character string indicating that the caller telephone set has a videophone function. If an output value for the class information indicates that the telephone set only has a voice telephone function, central controller 58 causes the buffer of analog controller 40 to store data of a character string "5555". In the present embodiment, "5555" is a character string indicating that the caller telephone set only has a voice telephone function.

In step S138, central controller 58 causes the buffer of analog controller 40 to store the telephone number of the caller telephone set.

In step S139, analog controller 40 controls analog interface portion 38 such that information stored in the buffer thereof is transmitted to destination plain old telephone set 24 as the information specifying the originator telephone set. The information stored in the buffer of analog controller 40 is the information corresponding to the type of the information to be communicated with the caller telephone set.

An operation of home gateway 26 based on the structure and the flowchart as above will now be described.

Figures 18, 19:
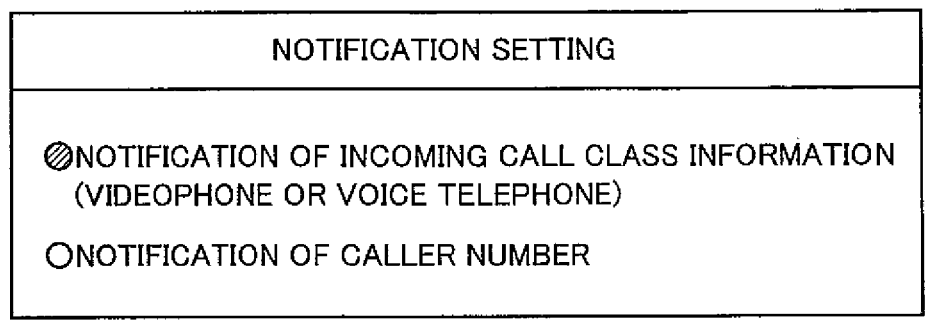
FIG. 18 illustrates an exemplary image displayed on a display according to the third embodiment of the present invention.
FIG. 19 illustrates exemplary information specifying a type or a connection state of each telephone set stored in a memory according to the third embodiment of the present invention.

When detector 44 detects a user's operation of operation portion 42, detector 44 outputs to central controller 58, information on the content of the user's operation of operation portion 42. Central controller 58 starts up "notification setting" (step S110). When the "notification setting" is started up, display controller 52 causes display 50 to display an image for "notification setting" under the control of central controller 58 (step S112). FIG. 18 illustrates an image displayed on display 50.

When the image is displayed, the user inputs the information specifying the content of "notification setting" through operation portion 42. When detector 44 detects the user's operation of operation portion 42, central controller 58 causes memory 46 to store the information specifying the content of "notification setting", based on the content of the user's operation (step S114). Here, as shown in FIG. 18, since an operation for giving notification as to whether the originator telephone set is the videophone or the voice telephone has been performed, the following information is stored. Specifically, such information is information that transmission of the information is necessary. Here, the information to be transmitted is information specifying a type of information. The type of information herein refers to a type of information to be communicated with the caller telephone set.

When such information is stored, memory 46 stores as terminal information, the type or a connection state of each telephone set configuring the IP telephone system according to the present embodiment (step S120). FIG. 19 illustrates a type (here, a type of a function of the telephone set) or a connection state of each telephone set stored in memory 46. When the terminal information is stored, after the processing in step S72, determination portion 62 identifies the information specifying the caller telephone number and the media information.

When the media information is identified, after the processing from step S124 to step S82, determination portion 62 of central controller 58 determines whether the value for variable count is greater than the value for variable daisu (step S129). Here, as the value for variable count is still smaller than the value for variable daisu (NO in step S129), determination portion 62 determines whether the telephone set corresponding to variable count is the plain old telephone set or not (step S130). Here, if it is assumed that the telephone set corresponding to variable count is the plain old telephone set (YES in step S130), determination portion 62 determines whether the class information should be displayed in addition to the caller telephone number or not (step S132). If the class information indicates that the telephone set has a videophone function and the class information is to be displayed in addition to the caller telephone number (YES in step S132), central controller 58 causes the buffer of analog controller 40 to store the data of the character string "7777" (step S136).

When the character string data is stored, analog controller 40 causes analog interface portion 38 to transmit the information stored in the buffer thereof (step S139).

When the information is transmitted, after the processing in step S88 and step S129, determination portion 62 determines whether the telephone set corresponding to variable count is the plain old telephone set or not (step S130). Here, if it is determined that the telephone set is an IP telephone set (NO in step S130), LAN controller 36 controls LAN interface portion 34 such that the class information and the telephone number of the caller telephone set are transmitted, under the control of central controller 58 (step S134). Thereafter, after the processing in step S88 is performed once, the processing from step S129 to step S88 is repeated.

As described above, the home gateway according to the present embodiment transmits as the originator information, the information indicating whether the originator telephone set is the videophone or the voice telephone. The telephone set, to which such information has been transmitted, can display whether the originator telephone set is the videophone or the voice telephone by using a number display (registered trademark) function. As such information is displayed by using number display (registered trademark), even an existing plain old telephone set can notify a user whether the caller telephone set is the videophone or the voice telephone. Since the user can be notified as such, the home gateway and the IP telephone system according to the present embodiment can allow the user to readily and reliably determine which telephone set is to be used to receive a call when a plurality of telephone sets can receive a call from a calling party. Such a problem that a call from a videophone is received by a voice telephone and only voice and sound is communicated or such a problem that a video image that the user does not want to show is displayed when a call arrives from a videophone can be avoided.

In addition, according to a variation, home gateway 26 may be a part of a telephone set. Here, the IP telephone system described above includes at least one telephone set (this telephone set may or may not be a plain old telephone set) and a telephone set having home gateway 26. Each of display 50 and sound output portion 54 of home gateway 26 operates as a part of the telephone set. Here, central controller 58 controls sound output portion 54 represented by the speaker such that the information corresponding to the type of the information to be communicated with the caller telephone set is output as voice and sound, or central controller 58 controls display 50 such that the information corresponding to the type of the information to be communicated with the caller telephone set is displayed.

Fourth Embodiment

An IF telephone system according to the fourth embodiment of the present invention will be described hereinafter.

The hardware configuration of the home gateway according to the present embodiment is the same as in the first embodiment described previously and the function thereof is also the same. Therefore, detailed description thereof will not be repeated here.

Figure 20:
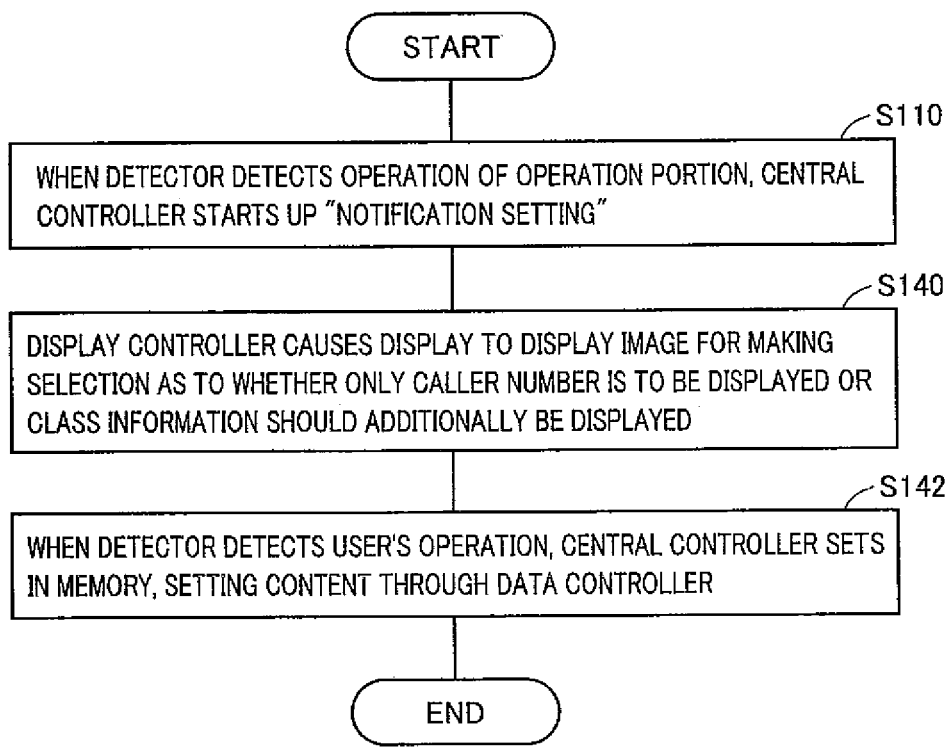
FIG. 20 is a flowchart showing a procedure for controlling processing for sending class information according to a fourth embodiment of the present invention.

Referring to FIG. 20, a program executed in home gateway 26 carries out the following control, in connection with notification setting.

It is noted that the processing in the flowchart shown in FIG. 20 the same as that previously shown in FIG. 16 has the same step number allotted and the processing is also the same. Therefore, detailed description thereof will not be repeated here.

In step S140, display controller 52 causes display 50 to display an image for setting "notification setting". In the present embodiment, the image for setting "notification setting" is an image for making setting as to whether only a telephone number of a caller telephone set is to be displayed or class information should additionally be displayed.

In step S142, when detector 44 detects the user's operation of operation portion 42, central controller 58 causes memory 46 to store the content of the user's operation detected by detector 44 as the information.

Figure 21:
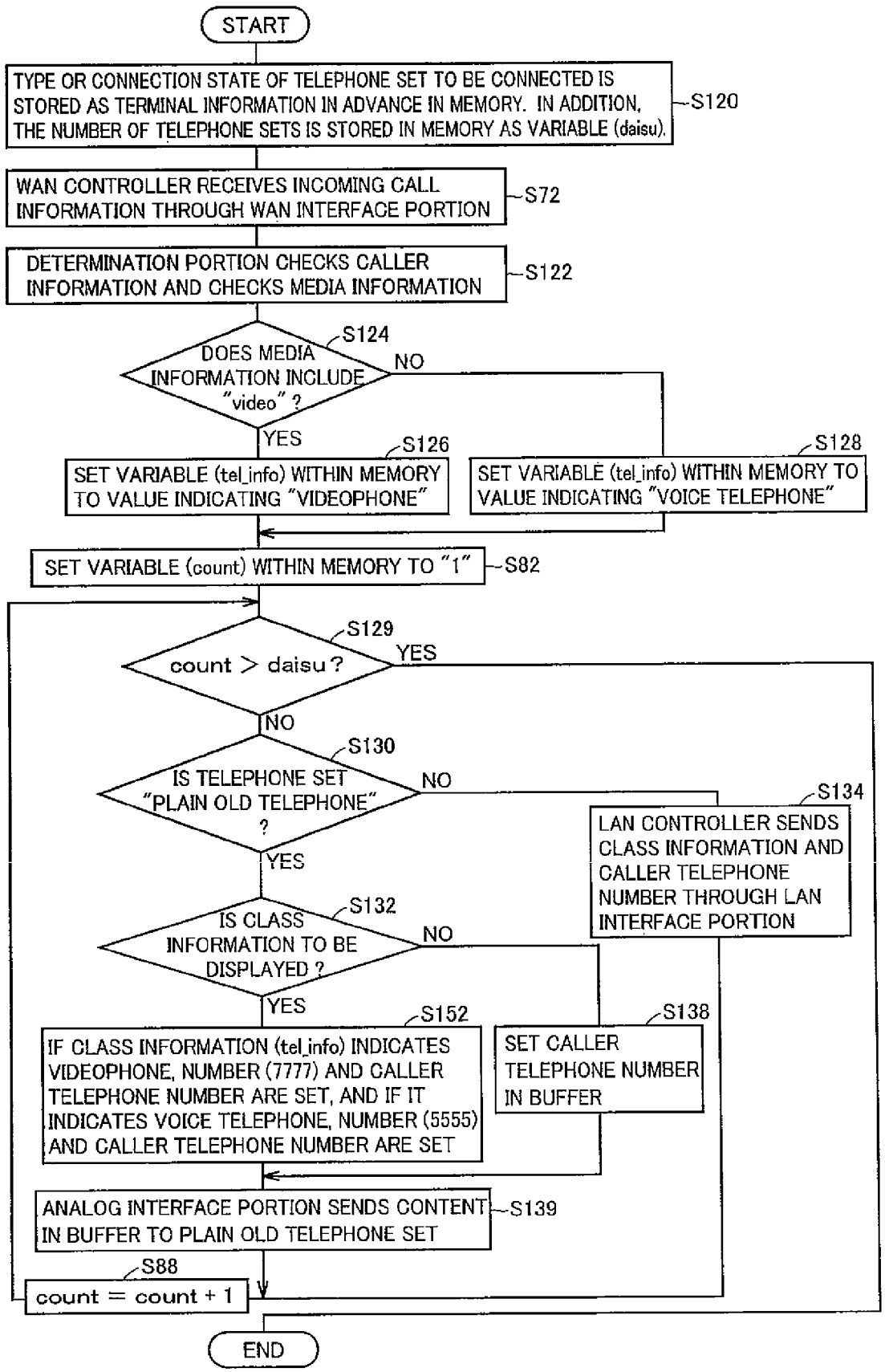
FIG. 21 is a flowchart showing a procedure for controlling telephone number notification processing according to the fourth embodiment of the present invention.

Referring to FIG. 21, a program executed in home gateway 26 carries out the following control, in connection with sending of the class information. It is noted that the processing in the flowchart shown in FIG. 21 the same as that previously shown in FIGS. 3 and 17 has the same step number allotted and the processing is also the same. Therefore, detailed description thereof will not be repeated here.

In step S152, if the value for variable tel_info indicates that the caller telephone set is the videophone, central controller 58 generates information specifying the character string "7777" and the telephone number of the caller telephone set, based on the value for variable tel_info and the caller telephone number stored in memory 46. In the present embodiment, "7777" indicates that the caller telephone set is the videophone. If the value for variable tel_info indicates that the caller telephone set is the voice telephone, central controller 58 generates information specifying the character string "5555" and the telephone number of the caller telephone set, based on the value for variable tel_info and the caller telephone number stored in memory 46. In the present embodiment, "5555" indicates that the caller telephone set is the voice telephone. Analog controller 40 causes the buffer thereof to store the information generated by analog controller 40 itself. Thus, central controller 58 generates information specifying the character string corresponding to the type of the information to be communicated with the caller telephone set and the telephone number. Central controller 58 generates such information based on the information specifying the type of the information to be communicated with the caller telephone set and the telephone number.

An operation of home gateway 26 based on the structure and the flowchart as above will now be described.

Figure 22:
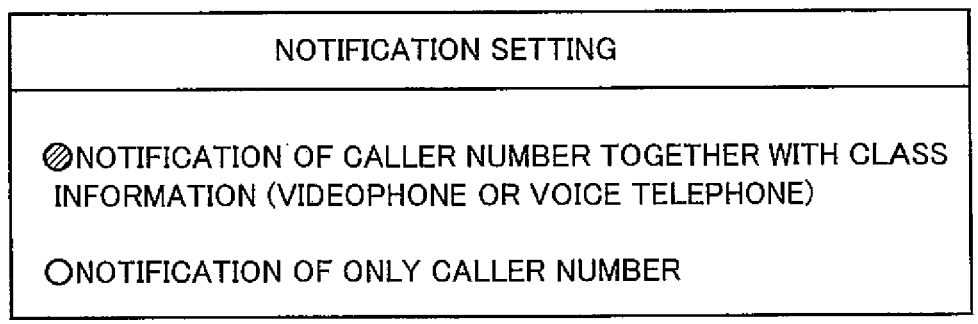
FIG. 22 illustrates an exemplary image displayed on a display according to the fourth embodiment of the present invention.

After the processing in step S110, display controller 52 causes display 50 to display an image for setting "notification setting" (step S140). FIG. 22 illustrates the image. When the image is displayed, detector 44 detects the user's operation of operation portion 42. Central controller 58 causes memory 46 to store the content of the user's operation as the information (step S142).

When the content of the user's operation is stored, memory 46 stores the terminal information under the control of data controller 48. Moreover, memory 46 stores the number of telephone sets configuring the IP telephone system according to the present embodiment as the value for variable daisu, under the control of data controller 48 (step S120).

When the information is stored, after the processing from step S72 to step S132, central controller 58 generates information specifying the character string "7777" or the character string "5555" and the telephone number of the caller telephone set, based on the value for variable tel_info and the caller telephone number stored in memory 46. When the information is generated, analog controller 40 causes the buffer thereof to store the information generated by analog controller 40 itself (step S152). When the information is stored, the processing in step S139 and step S88 is once performed, and thereafter the processing from step S129 to step S88 is repeated.

As described above, the home gateway according to the present embodiment transmits the character string of the caller telephone number as the information indicating the caller. The character string transmitted here is a character string to which a character string indicating a type of information (a type of information to be communicated with the caller telephone set) has been added. Thus, the telephone set receiving a call can simultaneously notify the user of the type of information to be communicated with the caller telephone set and the telephone number. In addition, the character string indicating the type of the information to be communicated with the caller telephone set may be "5555" and "7777" (or any character string obtained by combining as appropriate any of "0" to "9", "B", "C", "D", "#", and "*"). As such a character string is used, the user of an old-type telephone set can be notified of the type of the information (the type of the information to be communicated with the caller telephone set) and the telephone number. The home gateway according to the present embodiment may or may not add the character string indicating the type of the information to be communicated with the caller telephone set, depending on the content of setting stored in the memory. Thus, user's convenience is improved. Consequently, a highly convenient home gateway allowing the user to readily determine which telephone set is to be used to receive a call when a plurality of telephone sets can receive a call from a calling party can be provided. Such a problem that a call from a videophone is received by a voice telephone and only voice and sound is communicated or such a problem that a video image that the user does not want to show is displayed when a call arrives from a videophone can be avoided.

In addition, according to a variation, home gateway 26 may be a part of a telephone set. Here, the IP telephone system described above includes at least one telephone set (this telephone set may or may not be a plain old telephone set) and a telephone set having home gateway 26. Each of display 50 and sound output portion 54 of home gateway 26 operates as a part of the telephone set. Here, central controller 58 controls sound output portion 54 represented by the speaker such that the information corresponding to the type of the information to be communicated with the caller telephone set is output as voice and sound, or central controller 58 controls display 50 such that the information corresponding to the type of the information to be communicated with the caller telephone set is displayed.

Fifth Embodiment

An IP telephone system according to the fifth embodiment of the present invention will be described hereinafter.

The hardware configuration of the home gateway according to the present embodiment is the same as in the first embodiment described previously and the function thereof is also the same. Therefore, detailed description thereof will not be repeated here.

Figure 23:
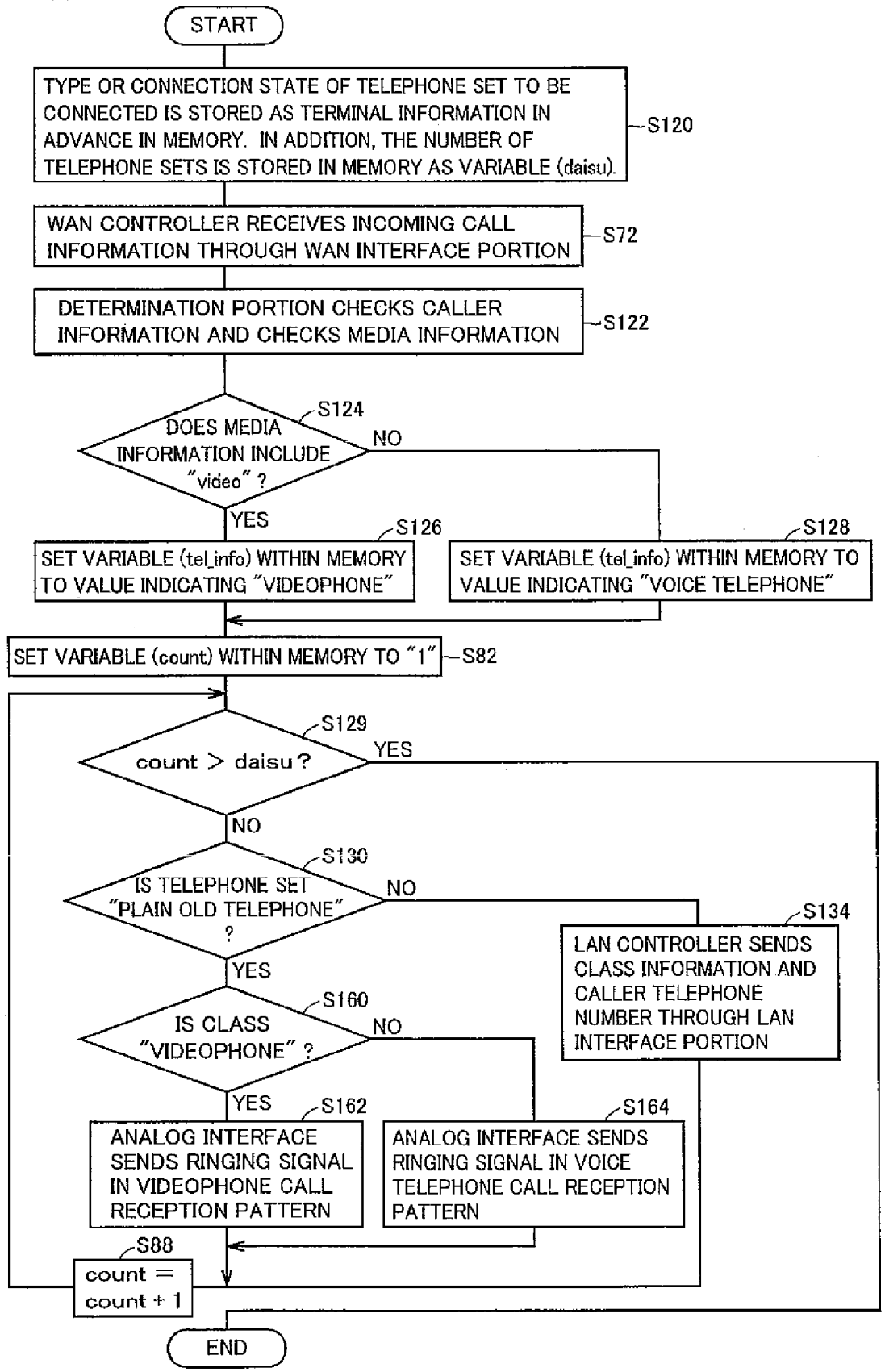
FIG. 23 is a flowchart showing a procedure for controlling processing for sending a ringing signal according to a fifth embodiment of the present invention.

Referring to FIG. 23, a program executed in home gateway 26 carries out the following control, in connection with sending of a ringing signal.

It is noted that the processing in the flowchart shown in FIG. 23 the same as that previously shown in FIGS. 3 and 17 has the same step number allotted and the processing is also the same. Therefore, detailed description thereof will not be repeated here.

In step S160, determination portion 62 determines whether the class of the telephone set corresponding to variable count is the videophone or not, by referring to the information stored in memory 46. If it is determined that the class is the videophone (YES in step S160), the process proceeds to step S162. Otherwise (NO in step S160), the process proceeds to step S164.

In step S162, analog interface portion 38 transmits a ringing signal in a videophone call reception pattern, under the control of analog controller 40.

In step S164, analog interface portion 38 transmits a ringing signal in a voice telephone call reception pattern, under the control of analog controller 40.

An operation of home gateway 26 based on the structure and the flowchart as above will now be described.

After the processing from step 120 to step S130, determination portion 62 determines whether the class of the telephone set corresponding to variable count is the videophone or not, by referring to the information stored in memory 46 (step S160). By performing the processing in step S124 prior to step S160, analog controller 40 and determination portion 62 control analog interface portion 38 such that the ringing signal corresponding to the content of the type information is transmitted to the destination telephone set when the information stored in memory 46 indicates that the destination telephone set is the plain old telephone. Here, if it is assumed that the class is the videophone (YES in step S160), analog interface portion 38 transmits the ringing signal in the videophone call reception pattern under the control of analog controller 40 (step S162).

When the ringing signal is transmitted, after the processing in step S88 and step S129 to step S130, determination portion 62 determines whether the class of the telephone set corresponding to variable count is the videophone or not, by referring to the information stored in memory 46 (step S160). Here, if it is assumed that the class is the voice telephone (NO in step S160), analog interface portion 38 transmits the ringing signal in the voice telephone call reception pattern under the control of analog controller 40 (step S164). Then, the processing in step S88 is performed once, and thereafter the processing from step S129 to step S88 is repeated.

As described above, the home gateway according to the present embodiment expresses the type of the information to be communicated with the caller telephone set (whether video image information can be communicated or not) by using a pattern of a ringing tone. As the type of the information to be communicated with the telephone set is expressed with a pattern of the ringing tone, even a plain old telephone set without including a display device or a plain old telephone set not adapted to number display (registered trademark) can notify the user of the type of the information to be communicated with the caller telephone set. Consequently, a conventional plain old telephone set can also be used without purchasing a new telephone set, and a home gateway allowing the user to readily determine which telephone set is to be used to receive a call when a plurality of telephone sets can receive a call from a calling party can be provided.

In addition, according to a variation, home gateway 26 may be a part of a telephone set. Here, the IP telephone system described above includes at least one telephone set (this telephone set may or may not be a plain old telephone set) and a telephone set having home gateway 26. Each of display 50 and sound output portion 54 of home gateway 26 operates as a part of the telephone set. Here, central controller 58 controls sound output portion 54 represented by the speaker such that the information corresponding to the type of the information to be communicated with the caller telephone set is output as voice and sound, or central controller 58 controls display 50 such that the information corresponding to the type of the information to be communicated with the caller telephone set is displayed.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A relay device comprising:
    an external communication portion communicating with an external telephone set;
    an internal communication portion communicating with an internal telephone set; and
    a controller controlling said internal communication portion such that type information in accordance with a type of information to be communicated with said external telephone set is transmitted when said external communication portion receives information,
    said controller including a generator generating said type information based on the information received by said external communication portion, and a communication controller controlling said internal communication portion such that said type information is transmitted to said internal telephone set, wherein said internal communication portion includes a unit communicating with a plurality of said internal telephone sets, said generator includes a unit generating said type information based on the information received by said external communication portion, that specifies said type of information to be communicated and a telephone number of said external telephone set, and said communication controller includes a unit controlling said internal communication portion such that said type information is transmitted to a destination telephone set representing any of said plurality of internal telephone sets as information specifying the telephone number of said external telephone set, wherein said generator includes a unit generating said type information by combining a character string corresponding to the type of information to be communicated with said external telephone set with the telephone number of said external telephone set.

2. The relay device according to claim 1, wherein said relay device further comprises a storage storing information indicating whether said internal telephone set is a plain old telephone, for each said internal telephone set, and said communication controller includes a unit controlling said internal communication portion such that a ringing signal corresponding to content of said type information is transmitted to a destination telephone set when the information stored in said storage indicates that the destination telephone set representing any of said plurality of internal telephone sets is the plain old telephone.

3. The relay device according to claim 1, wherein said relay device further comprises a storage storing information indicating whether said internal telephone set operates as a voice telephone, for each said internal telephone set, and said communication controller includes a unit controlling said internal communication portion such that a ringing signal corresponding to content of said type information is transmitted to a destination telephone set when the information stored in said storage indicates that the destination telephone set representing any of said plurality of internal telephone sets operates as a telephone set other than said voice telephone.

4. The relay device according to claim 3, wherein said storage includes a unit storing information received by said internal communication portion from said internal telephone set, that indicates whether said internal telephone set operates as said voice telephone.

5. A relay device comprising:

an external communication portion communicating with an external telephone set;

an internal communication portion communicating with an internal telephone set; and a controller controlling said internal communication portion such that type information in accordance with a type of information to be communicated with said external telephone set is transmitted when said external communication portion receives information, said controller including a generator generating said type information based on the information received by said external communication portion, and a communication controller controlling said internal communication portion such that said type information is transmitted to said internal telephone set, said relay device further comprising an input portion through which a user inputs necessity information, that is information indicating necessity of transmission of said type information, wherein said communication controller includes a unit controlling said internal communication portion such that said type information is transmitted when said necessity, information indicates necessity of transmission of said type information.

6. A relay device comprising:

an external communication portion communicating with an external telephone set;

an internal communication portion communicating with an internal telephone set; and a controller controlling said internal communication portion such that type information in accordance with a type of information to be communicated with said external telephone set is transmitted when said external communication portion receives information, said controller including a generator generating said type information based on the information received by said external communication portion, and a communication controller controlling said internal communication portion such that said type information is transmitted to said internal telephone set, said relay device further comprising a speaker outputting information as sound, wherein said controller further includes a unit controlling said speaker such that said type information is output as sound.

7. A relay device comprising:

an external communication portion communicating with an external telephone set;

an internal communication portion communicating with an internal telephone set; and a controller controlling said internal communication portion such that type information in accordance with a type of information to be communicated with said external telephone set is transmitted when said external communication portion receives information, said controller including a generator generating said type information based on the information received by said external communication portion, and a communication controller controlling said internal communication portion such that said type information is transmitted to said internal telephone set, said relay device further comprising a display device displaying information as an image, wherein said controller further includes a unit controlling said display device to display said type information.

8. A relay device comprising:

an external communication portion communicating with an external telephone set;

an internal communication portion communicating with an internal telephone set; and a controller controlling said internal communication portion such that type information in accordance with a type of information to be communicated with said external telephone set is transmitted when said external communication portion receives information,
said controller including
a generator generating said type information based on the information received by said external communication portion, and
a communication controller controlling said internal communication portion such that said type information is transmitted to said internal telephone set,
said relay device further comprising:
a speaker outputting information as sound; and
a storage storing information on said internal telephone set, that indicates whether said internal telephone set operates as a voice telephone, wherein
said communication controller includes a unit controlling said internal communication portion such that a ringing signal corresponding to content of said type information is transmitted to said internal telephone set when the information stored in said storage indicates that said internal telephone set operates as a telephone set other than the voice telephone, and
said controller further includes a unit controlling said speaker such that said type information is output as sound.

9. A relay device comprising:
an external communication portion communicating with an external telephone set;
an internal communication portion communicating with an internal telephone set; and
a controller controlling said internal communication portion such that type information in accordance with a type of information to be communicated with said external telephone set is transmitted when said external communication portion receives information,
said controller including
a generator generating said type information based on the information received by said external communication portion, and
a communication controller controlling said internal communication portion such that said type information is transmitted to said internal telephone set,
said relay device further comprising:
a display device displaying information as an image; and
a storage storing information on said internal telephone set, that indicates whether said internal telephone set operates as a voice telephone, wherein
said communication controller includes a unit controlling said internal communication portion such that a ringing signal corresponding to content of said type information is transmitted to said internal telephone set when the information stored in said storage indicates that said internal telephone set operates as a telephone set other than the voice telephone, and
said controller further includes a unit controlling said display device to display said type information.

* * * * *